United States Patent
Dunsby

(10) Patent No.: US 8,582,203 B2
(45) Date of Patent: Nov. 12, 2013

(54) OPTICAL ARRANGEMENT FOR OBLIQUE PLANE MICROSCOPY

(75) Inventor: Christopher William Dunsby, Leighton Buzzard (GB)

(73) Assignee: Imperial Innovations Limited, London (GB)

(*) Notice: Subject to any disclaimer, the term of this patent is extended or adjusted under 35 U.S.C. 154(b) by 188 days.

(21) Appl. No.: 13/056,345

(22) PCT Filed: Jul. 20, 2009

(86) PCT No.: PCT/GB2009/001802
§ 371 (c)(1),
(2), (4) Date: Feb. 23, 2011

(87) PCT Pub. No.: WO2010/012980
PCT Pub. Date: Feb. 4, 2010

(65) Prior Publication Data
US 2011/0261446 A1 Oct. 27, 2011

(30) Foreign Application Priority Data
Jul. 31, 2008 (GB) .................................. 0814039.4

(51) Int. Cl.
*G02B 21/00* (2006.01)
(52) U.S. Cl.
USPC .......................................................... 359/368
(58) Field of Classification Search
USPC ................................................ 359/368–390
See application file for complete search history.

(56) References Cited

U.S. PATENT DOCUMENTS

| | | | |
|---|---|---|---|
| 3,547,512 A | 12/1970 | Baer | |
| 4,478,482 A | 10/1984 | Koester | |

(Continued)

FOREIGN PATENT DOCUMENTS

| | | | |
|---|---|---|---|
| JP | 2005337940 A | * | 12/2005 |
| WO | 03027644 | | 4/2003 |
| WO | 2008078083 | | 3/2008 |

OTHER PUBLICATIONS

Orthogonal-plane fluorescence optical sectioning: three-dimensional imaging of macroscopic biological specimens, A.H. Voie, et al., Journal of Microscopy, vol. 170, Pt 3, Jun. 1993, pp. 229-236.

(Continued)

*Primary Examiner* — Mark Consilvio
(74) *Attorney, Agent, or Firm* — Kirschstein, et al.

(57) ABSTRACT

An optical arrangement for oblique plane microscopy includes a first optical subassembly having an objective lens that receives light from a sample in use, and configured to produce an intermediate image of the sample, and a second optical subassembly focused on the intermediate image. Optical axes of the first and second subassemblies are at an angle to each other at the point of the intermediate image, such that the second subassembly images an oblique plane in the intermediate image, corresponding to an oblique plane in the sample. An oblique plane microscopy method is performed by directing an incident light beam through the objective lens to illuminate or excite the oblique plane in the sample, and receiving light from the sample through the same objective lens. The incident light beam is incident on the sample at an angle of substantially 90° relative to the light beam received from the sample.

26 Claims, 9 Drawing Sheets

(56) References Cited

U.S. PATENT DOCUMENTS

| | | | |
|---|---|---|---|
| 5,671,085 A * | 9/1997 | Gustafsson et al. | 359/385 |
| 5,715,081 A | 2/1998 | Chastang | |
| 5,729,383 A * | 3/1998 | Chastang et al. | 359/385 |
| 5,793,525 A * | 8/1998 | Sabin et al. | 359/384 |
| 6,778,267 B2 * | 8/2004 | Drake | 356/237.1 |
| 7,265,900 B2 * | 9/2007 | Korngut et al. | 359/385 |
| 7,463,344 B2 * | 12/2008 | Wolleschensky et al. | 356/72 |
| 7,570,362 B2 * | 8/2009 | Dosaka et al. | 356/445 |
| 7,961,385 B2 * | 6/2011 | Sander | 359/373 |
| 2003/0027367 A1 | 2/2003 | Watkins et al. | |
| 2006/0007531 A1 | 1/2006 | Korengut et al. | |
| 2006/0012863 A1 * | 1/2006 | Goelles et al. | 359/385 |
| 2006/0033987 A1 | 2/2006 | Stelzer | |
| 2007/0109633 A1 | 5/2007 | Stelzer | |
| 2012/0281264 A1 * | 11/2012 | Lippert et al. | 359/199.3 |

OTHER PUBLICATIONS

Thin laser light sheet microscope for microbial oceanography, Eran Fuchs, et al., Scripps Institution of Oceanography, Marine Biology Research Division, Optics Express, Jan. 28, 2002, vol. 10, No. 2, pp. 145-154.

Optical Sectioning Deep Inside Live Embryos by Selective Plane Illumination Microscopy, Jan Huisken, et al., www.sciencemag.org, Science, vol. 305, Aug. 13, 2004, pp. 1007-1009.

Highly inclined thin illumination enables clear single-molecule imaging in cells, Makio Tokunaga, et al., Nature Methods, vol. 5, No. 2, Feb. 2008, pp. 159-161.

Variable-angle epifluorescence microscopy: a new way to look at protein dynamics in the plant cell cortex, Catherine A. Konopka, et al., Journal Compilation 2007, The Plant Journal, 2008, pp. 186-196.

Aberration-free optical refocusing in high numerical aperture microscopy, Edward J. Botcherby, et al., Department of Engineering Science, Optics Letters, Jul. 15, 2007, vol. 32, No. 14, pp. 2007-2009.

* cited by examiner

OPTICAL ARRANGEMENT FOR OBLIQUE PLANE MICROSCOPY

This invention relates to optical microscopy, and in particular to an optical arrangement for selective illumination and microscopic imaging of an oblique plane within a specimen.

BACKGROUND TO THE INVENTION

Conventional optical microscopy provides high resolution (~200 nm) images and has a huge range of applications, from inspection of electronic devices to cell biology. In many cases, it is desirable to obtain so-called 'optically sectioned' images, i.e. an image of only an axially thin slice through the sample. The advantages of optically sectioned imaging include reduction of out-of-focus blur, a potential increase in resolution, a reduction in light scattered from out-of-focus planes, and an ability to produce high resolution 3D images. The conventional method for obtaining high quality optically sectioned images is confocal microscopy.

Confocal microscopy involves scanning a point of illumination and detecting the reflected or fluorescent light back to a confocal point detector. This results in high quality confocal imaging, but it is necessary to scan the point source and detection region over the sample in two or three dimensions, depending on whether a 2D or 3D image is required. Such scanning can limit the data acquisition rate or, if rapid scanning is employed, will increase the peak power at the sample, which can lead to increased photodamage and phototoxicity of biological samples.

The scanning speed in confocal microscopy can be increased through the use of multiple excitation and detection spots, e.g. in a Nipkow disk microscope. However, the closer adjacent spots are placed, the greater the chance of cross-talk between neighbouring confocal pinholes, which produces a concomitant increase in the size of side lobes or pedestal on the axial point spread function.

A number of alternative methods to confocal microscopy have been proposed, generally termed 'structured illumination' techniques. However, these all require the acquisition of multiple images using a CCD camera followed by image processing to calculate the sectioned image. Performing calculations on weak (noisy) fluorescence images leads to a compounding of the noise in the final image. All confocal and structured illumination techniques require that the whole sample be illuminated along its axial extent, even though only a single lateral plane in the sample is being imaged, and this leads to unnecessary photobleaching and phototoxic effects.

A recently developed technique for obtaining optically sectioned images is that of Selective Plane Illumination Microscopy (SPIM) [1,2], which followed early work by Voie et al. [3] and Fuchs et al. [4]. The SPIM technique [5] uses two objective lenses, separated by an angle of 90° relative to one another and used to view the same sample. One lens is used to illuminate only a thin 'sheet' within the sample and the second lens is used to produce a diffraction limited image of this sheet. The optical configuration for SPIM is illustrated in FIG. 1. The region in the sample where fluorescence is excited is perfectly imaged by the detection optics onto the detection image plane. It should be noted that the image is stretched axially due to the greater ($M^2$) axial magnification of the detection optical system. SPIM has been used to obtain images of small organisms and embryos and can be used to image both reflected or scattered light and fluorescence [5].

The drawback of SPIM is that two objective lenses are required and this gives rise to the two main disadvantages of this technique. First, it is mechanically difficult to arrange for the two objectives to be placed close enough to one another so that a high numerical aperture lens can be used to collect the light while still being able to produce a thin sheet of illumination. This can restrict the numerical aperture and hence resolution of the imaging system. Second, the need to illuminate the sample with a lens that is in the plane of the sample being imaged means that conventional sample preparation techniques, e.g. glass microscope slides, cannot be used, and a special sample holder needs to be used instead.

Recent work by Tokunaga et al. [6] and Konopka et al. [7] has shown that it is possible to illuminate a thin sheet of a sample using the same objective that is used to collect the fluorescence. This is illustrated in FIG. 2. This imaging system was termed Highly Inclined and Laminated Optical sheet (HILO) microscopy and variable angle epi-fluorescence microscopy. A 3D image of the specimen can then be produced by scanning the sheet illumination or specimen in one direction. This system is nearly equivalent to a SPIM system, but with two significant differences; the illumination and detection beams are not at 90° (as is usual for SPIM) and the sheet of illumination does not align in the focal plane of the imaging system used to collect the reflected/scattered light or fluorescence. This is shown in the image plane of FIG. 2, where the image of the sample fluorescence (shown as a stripe) lies at significant angle to the image plane (dashed line). The detector cannot simply be tilted with respect to the optical axis due to unwanted spherical aberrations that would arise. This aberration will be most severe for parts of the image of the sample image that are furthest from the image plane.

There is therefore a desire to be able to use a technique similar to SPIM, but using a single objective lens at the sample, and with the illumination and detection beams at 90° at the sample, whilst avoiding (or at least minimising) the aberration affects.

Further background art is provided in WO 2008/078083, which discloses a focusing apparatus for use with an optical system. The focusing apparatus includes a focus adjusting means, which enables the position of a selected axial focal plane to be adjusted within the sample.

SUMMARY OF THE INVENTION

According to a first aspect of the present invention there is provided an optical arrangement for oblique plane microscopy comprising: a first optical subassembly, including an objective lens arranged to receive light from a sample in use, and configured to produce an intermediate image of the sample; and a second optical subassembly focused on the intermediate image, the optical axis of the second optical subassembly being at an angle to the optical axis of the first optical subassembly at the point of the intermediate image, such that the second optical subassembly images an oblique plane in the intermediate image, corresponding to an oblique plane in the sample. The angle between the two optical axes enables the second optical subassembly to be arranged normal to the oblique plane in the intermediate image, thereby enabling the oblique plane in the sample to be imaged without aberrations.

Optional features are defined herein.
Optional features are defined in the dependent claims.
Thus, the first optical subassembly may comprise a first part arranged to produce a magnified image of the sample, and a second part arranged to de-magnify the image obtained from the first part and thereby form the intermediate image.

Preferably the first optical subassembly is configured to produce the intermediate image with a magnification of unity in both the lateral and axial directions. By recreating the original sample both laterally and axially in the intermediate image, this minimizes the effect of aberrations. However, if the first optical subassembly images the sample whilst in an immersion medium (e.g. water or oil) then the magnification of the first optical subassembly is preferably equal to the refractive index of this immersion medium. If the intermediate image is also formed in an immersion medium, then the total magnification of the first optical subassembly is preferably equal to the ratio of the refractive indices of the two immersion media. That is to say, if the sample is placed in a first immersion medium having a refractive index $n_1$, or the intermediate image is formed in a second immersion medium having a refractive index $n_2$, then the first optical subassembly is preferably configured to produce the intermediate image with a magnification of M in both the lateral and axial directions, where M is equal to the ratio $(n_1/n_2)$ of the refractive indices of the first and second immersion media.

Although the first and second optical subassemblies may be formed using separate physical components, in alternative embodiments they may share common optical components, thereby making the overall optical arrangement potentially more compact. Common optical components may be used, for example, if a plane mirror is situated at the focus of the second part of the first optical subassembly (e.g. as is shown in FIG. 3).

Preferably the numerical aperture of the first optical subassembly is greater than the numerical aperture of the second optical subassembly.

Preferably the said objective lens has a high numerical aperture.

Preferably a light source is arranged to provide an incident beam of light to illuminate or excite an oblique plane in the sample, the oblique plane illuminated/excited corresponding to the oblique plane being imaged.

More preferably, the incident beam of light is directed through the same objective lens as that which is used to receive light from the sample. Using a single objective lens in this manner reduces the number of components in the overall assembly, and potentially makes it more compact and manoeuvrable, particularly in the vicinity of the sample. Moreover, as a result of having only a single objective lens at the sample, a high numerical aperture lens can be used to collect the light while still being able to produce a thin sheet of illumination. Additionally, as a consequence of using a single objective lens at the sample, conventional sample preparation techniques, e.g. glass microscope slides, can be employed.

Particularly preferably the incident beam of light is directed through the objective lens such that it is incident on the sample at an angle of substantially 90° relative to the beam of light received from the sample through the same objective lens. By selectively illuminating the oblique plane in this manner, and collecting the light from it normal)(90° to the oblique plane, a thin plane may be imaged, without aberrations, and better spatial resolution and sectioning may be achieved.

The incident beam of light may be directed along the whole of the first optical subassembly. Such a configuration enables all the optical components required for oblique plane microscopy to be placed outside the body of a 'conventional' microscope.

Additionally, or alternatively, the components defining the illumination beam path and the second optical subassembly may be mounted on a common platform, and actuation means may be provided for translating the components defining the illumination beam path and the second optical subassembly together. This enables the plane being imaged to be moved through the sample, without affecting or moving the sample itself.

The optical arrangement may further comprise means for changing the magnification of the said objective lens, and means for changing one or more optical components elsewhere in the optical arrangement in correspondence with the change in magnification of the said objective lens, so as to maintain a desired overall magnification within the first optical subassembly.

The optical arrangement may further comprise an image rotating prism such as a Dove prism behind the said objective lens, in order to be able to change the orientation of the oblique illumination plane and the obliquely imaged plane in the sample simultaneously, without the need to physically rotate relatively large parts of the apparatus.

The optical arrangement may be arranged such that the image contrast arises from light reflected or scattered by the sample, or from the polarization state of the reflected or scattered light.

Alternatively, the optical arrangement may be arranged such that the image contrast arises from fluorescent light emitted from the sample, optionally as a result of a multiphoton excitation process. The fluorescent light may be excited at one or more wavelengths and detected in corresponding detection bands at longer (for single photon excitation) or shorter (for multiphoton excitation) wavelengths than each excitation wavelength. Alternatively, the image contrast may arise from differences in the fluorescence lifetime of the sample, or from the polarization state of the emitted fluorescence.

In use, the optical arrangement may be arranged to image particles or cells flowing through the oblique image plane, for example in a microfluidic device.

Alternatively, it may be set up in combination with an electronically-controlled stage for positioning the sample or for moving the sample in one or more directions. By scanning the sample in one or more directions it is then possible to build up a 3D image of the sample.

Preferably the second optical subassembly is arranged to have a combination of both a long working distance and a high numerical aperture, so as to facilitate the avoidance of collisions with the optical elements that make up the first optical subassembly.

According to a second aspect of the present invention there is provided a method of performing oblique plane microscopy comprising: receiving light from a sample via a first optical subassembly and producing an intermediate image of the sample; and focusing a second optical subassembly on the intermediate image, the optical axis of the second optical subassembly being at an angle to the optical axis of the first optical subassembly at the point of the intermediate image, such that the second optical subassembly images an oblique plane in the intermediate image, corresponding to an oblique plane in the sample.

In embodiments employing fluorescence imaging, the fluorescence may originate from single individually-resolvable molecules. The method may further comprise adjusting the number of fluorescent molecules in the sample by activating or deactivating the fluorescence via a photoactivation or photo-switching mechanism, thereby enabling molecules to be individually resolved. The photoactivation or photo-switching mechanism may be controlled by illumination of the sample (that may be wide-field or may be an oblique illumination) at one or more additional wavelengths.

Also with fluorescence imaging, or when imaging reflected or scattered light, the method may further comprise modifying the excitation sheet so that it is exhibits a more complex form such as a sinusoidal grating. Additional resolution may be obtained by modulating the position or phase of the complex illumination (e.g. sinusoidal grating) and acquiring a plurality of images at different modulations.

According to a third aspect of the present invention there is provided a method of performing oblique plane microscopy comprising directing an incident beam of light through an objective lens to illuminate or excite an oblique plane in a sample, and receiving light from the sample through the same objective lens, wherein the incident beam of light is incident on the sample at an angle of substantially 90° relative to the beam of light received from the sample.

According to a fourth aspect of the present invention there is provided a microscope comprising an optical arrangement in accordance with the first aspect of the invention, or which is configured for performing a method in accordance with the second or third aspects of the invention. Optical elements may be added to a conventional microscope to form embodiments of the invention.

BRIEF DESCRIPTION OF THE DRAWINGS

Embodiments of the invention will now be described, by way of example only, and with reference to the drawings in which.

In the figures, like elements are indicated by like reference numerals throughout.

DETAILED DESCRIPTION OF PREFERRED EMBODIMENTS

The present embodiments represent the best ways known to the applicant of putting the invention into practice. However, they are not the only ways in which this can be achieved.

The present embodiments provide a method of correcting for the aberrations occurring in the HILO technique [6,7] so that true SPIM can be achieved using a single high numerical aperture lens. High numerical aperture (NA) microscope objectives allow light to be collected over a range of angles that is much larger than 90°, e.g. a water immersion lens with an NA of 1.2 collects light over 130°. The principle of SPIM can therefore be achieved using a single objective lens. The present embodiments also include correction optics that allow an oblique plane in the sample to be imaged without encountering optical aberrations. The use of a conventional microscope objective means that biological samples prepared on conventional glass slides can be imaged with high resolution.

A recent paper [8] (and patent application WO 2008/078083) describes a technique for 'Aberration-free optical refocusing in high numerical aperture microscopy'. This paper describes a microscope system that can be refocused without moving either the sample or the primary microscope objective. This is achieved by coupling a second (almost) identical microscope to the back of the microscope used to image the sample. A third microscope system is then used to re-magnify the image produced by the second system, and can be positioned so as to image a range of focal planes perpendicular to the optical axis within the specimen. This combination of microscope imaging systems corrects for the severe out-of-plane aberrations (mostly spherical aberration) that prevent refocusing of the detector plane in a conventional microscope. However, neither the concept of imaging of oblique planes nor the concept of oblique illumination is provided for.

A key feature of the embodiments disclosed in the present patent application is that, by angling the third microscope with respect to the second system, it is possible to perfectly image an oblique plane through the sample. This is exactly what is required to correct the aberrations encountered in single objective SPIM or HILO microscopy.

Figure 1:
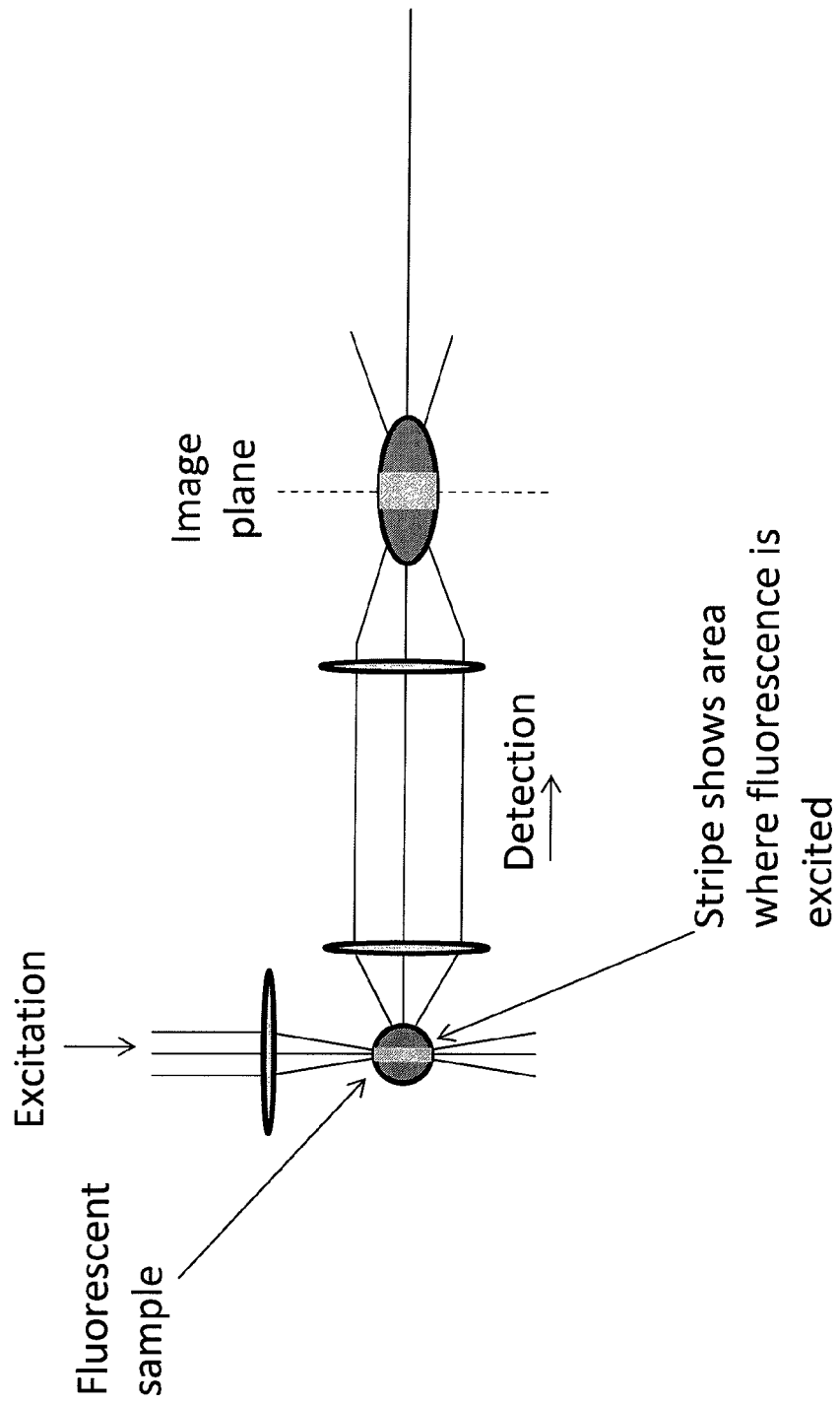
FIG. 1 illustrates the optical configuration for SPIM [1, 2, 3, 4, 5] according to the prior art.
Figure 2:
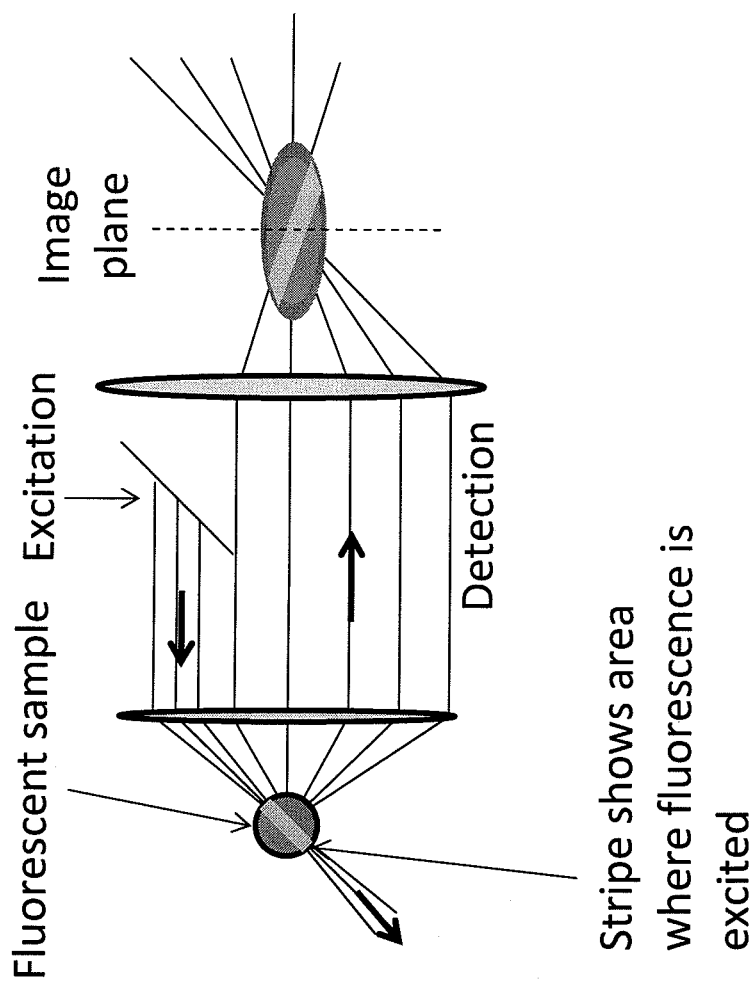
FIG. 2 illustrates the optical configuration for HILO [6] using a single objective lens according to the prior art.
Figure 3:
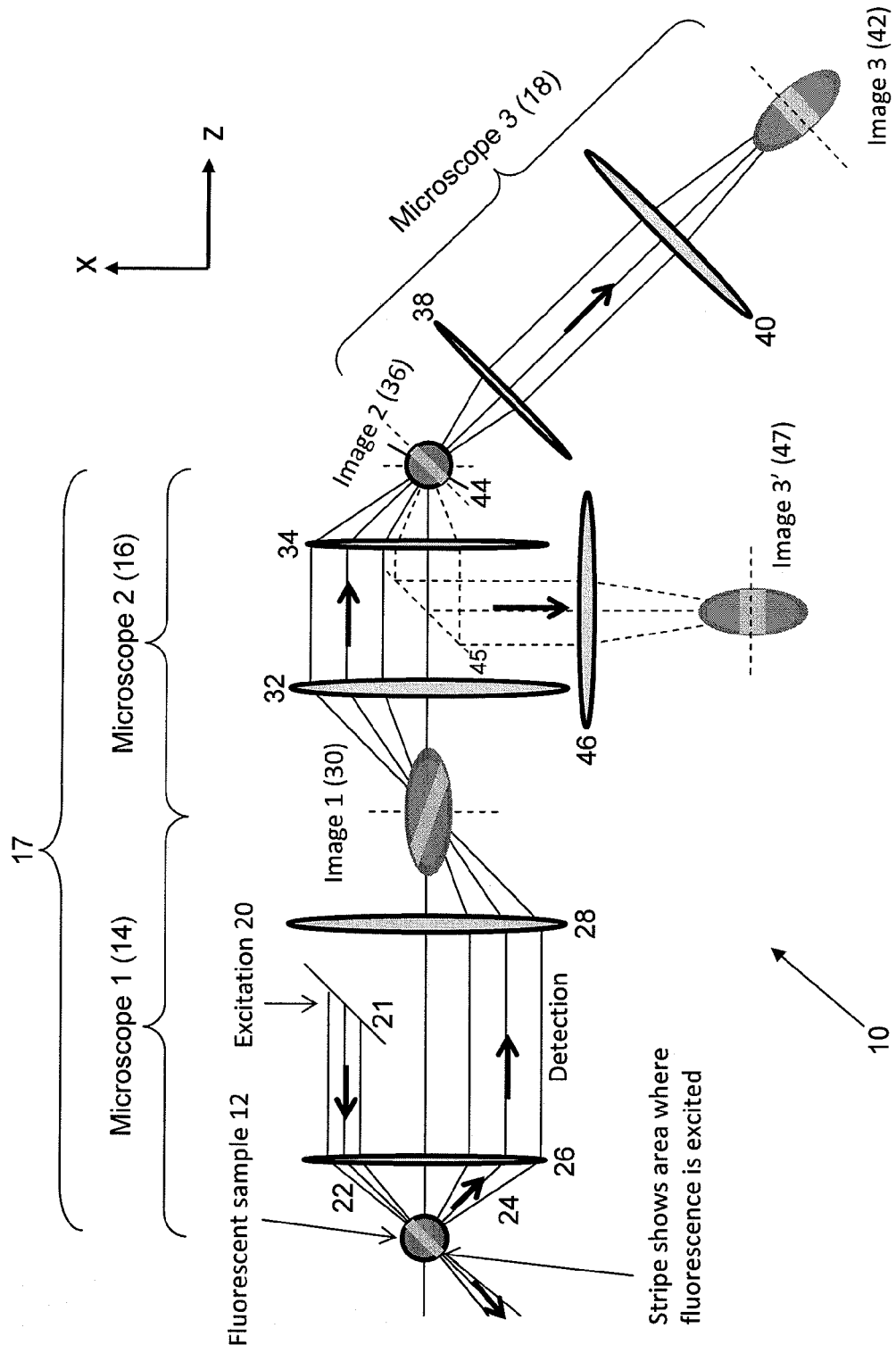
FIG. 3 illustrates the optical configuration of an embodiment of the invention.

FIG. 3 is a schematic diagram of an embodiment of the aberration correction principle according to the present invention. The present technique may be referred to as oblique plane microscopy (OPM). In use, the optical arrangement 10 of FIG. 3 may be integrated in a microscope, or provided as a "bolt-on" attachment for existing microscopes.

Figure 4:
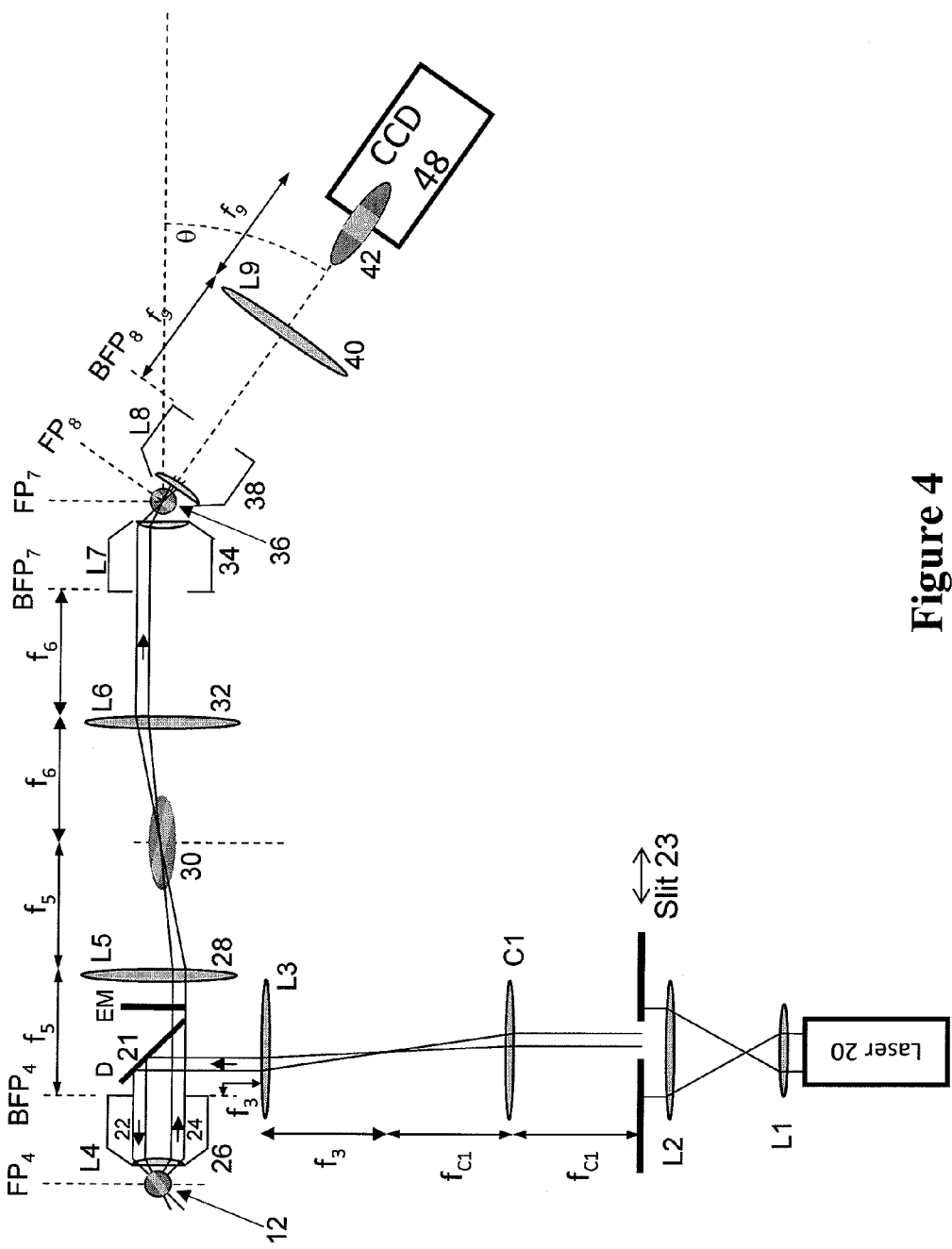
FIGS. 4 and 5 illustrate laboratory prototypes of embodiments of the invention.

The optical arrangement 10 of FIG. 3 comprises a first optical subassembly 17 and a second optical subassembly 18. At one end of the first optical subassembly 17 is an objective lens 26 having a high numerical aperture. In use, a sample 12 is located in the focal plane of the objective lens 26. A light source 20 is arranged to provide an incident beam of light 22 to illuminate or excite a selected oblique plane (illustrated as a stripe in FIGS. 3, 4, 5 and 6) in the sample 12. In order to illuminate this oblique plane, the incident beam 22 is directed, via mirror 21, through one side of the objective lens 26. In other embodiments of the invention, mirror 21 may be replaced by a larger partially reflecting beamsplitter or dichroic mirror that covers the whole of the back aperture of lens 26, e.g. as shown in FIG. 4.

The light source 20 may be a laser, or some other source of visible light, or a source of light outside the visible region, such as ultraviolet or infrared. The light source may be reflected or scattered from the sample, or fluorescence excited through a one- or multi-photon absorption process may be used.

Excited by the incident beam 22, the selected oblique plane in the sample 12 emits fluorescence light 24. The fluorescence light 24 is collected by the first optical subassembly 17. (In alternative embodiments, reflected or scattered light instead of fluorescence may be collected.) At the sample, the group of rays forming the detected beam 24 is at substantially 90° to the group of rays forming the incident beam 22, and is collected through the same objective lens 26 as is used to illuminate the sample. The detected beam 24 passes through the opposite side of the objective lens 26 from the path of the incident beam 22. The detected beam 24 is then directed through further lenses 28, 32 and 34 to produce an intermediate image 36. The objective lens 26, lens 34 and lens 38 are not restricted to operating in air and may use any other immersion medium, such as oil or water.

The first optical subassembly 17 may be regarded as comprising a first microscope part 14 and a second microscope part 16. The first microscope part 14, which comprises lenses 26 and 28, produces a magnified image 30 (Image 1) of the sample 12. The second microscope part 16, which comprises lenses 32 and 34, is arranged to de-magnify the image 30 to produce the intermediate image 36 (Image 2) which corresponds to the sample 12. The intermediate image 36 is at a magnification of unity in both the axial and lateral directions (in the case that lens 26 operates in air) with respect to the sample 12. By recreating the original sample 12 both axially and laterally in the intermediate image 36, this is expected to prevent the effect of optical aberrations. In effect, lenses 32 and 34 compensate for (or "undo") any aberrations produced by lenses 26 and 28. The first optical subassembly 17 may be implemented with any number of optical elements that achieves the same result.

Lens 34 has a sufficiently high numerical aperture such that it does not restrict or reduce the numerical aperture of the first optical subassembly 17.

The second optical subassembly 18, which comprises lenses 38 and 40, is arranged such that lens 38 focuses on the intermediate image 36. The focal plane of lens 38 intersects with the focal plane of lens 34 at the centre of the intermediate image 36. In a preferred embodiment of the invention, lens 38 is designed to operate with both a long working distance and high numerical aperture, so that the desired angle between lenses 34 and 38 can be achieved without the two lenses colliding. The light collected from the image 36 is magnified by lenses 38 and 40, which also focuses the light, thereby producing a magnified image 42 of the sample 12. The resulting magnified image 42 (Image 3) may be detected by a charge-coupled device (CCD) detector (e.g. detector 48 in FIGS. 4, 5 and 6), or other means for detecting or viewing the magnified image. The second optical subassembly 18 may be implemented with any number of optical elements that achieves the same result.

At the point of the intermediate image 36 (i.e. at the point where the focal plane of lens 38 intersects with the focal plane of lens 34), the optical axis of the second optical subassembly 18 is at an angle to the optical axis of the first optical subassembly. The angle between the optical axes of the first and second optical subassemblies at the point of the intermediate image 36 corresponds to the angle of the selected plane within the sample 12 relative to the optical axis of the objective lens 26. This configuration enables the objective lens 38 to receive light normal to the selected plane within the intermediate image 36, along the optical axis of lens 38, even though the selected plane is at an oblique angle in the sample 12. That is to say, the selected plane within the intermediate image 36 is aligned with the focal plane of lens 38.

Considering it another way, at the point of the intermediate image 36 the rays of light leave lens 34 and converge (towards the point of the intermediate image 36) about an angle relative to the optical axis of lens 34, the angle corresponding to the angle of the selected plane within the sample 12 relative to the optical axis of the objective lens 26. These converging rays are then collected by the second optical subassembly 18. The focal point of lens 38 of the second optical subassembly 18 coincides with the focal point of the converging rays leaving lens 34, and the optical axis of lens 38 is centred about the rays leaving lens 34.

It will be appreciated that good quality lenses are generally designed to magnify or focus light received at their designed focal plane without introducing optical aberrations. Accordingly, since the objective lens 38 of the second optical subassembly 18 receives the incoming light centrally about its designed focal plane, rather than at an angle, it is able to magnify the selected plane without introducing optical aberrations.

Also, by virtue of the second optical subassembly 18 focusing on and magnifying the intermediate image 36 (rather than the sample 12 itself), the second optical subassembly 18 is able to re-image any plane in the intermediate image 36 without the need to adjust or disturb the specimen 12. This concept is similar to the ideas presented in [8], with the important exception that now an oblique plane in the specimen is imaged.

The range of angles of oblique planes that can be imaged depends on the lenses used. The formulae that can be used to calculate this are provided in the Appendix.

In practice, the light rays 24 emitted (or reflected or scattered) from the sample will be emitted in all directions. The numerical aperture of the objective lens 38 of the second optical subassembly 18 places the restriction on the range of angles of light that are ultimately collected by the detector or CCD camera 48.

Image contrast may be achieved in a number of ways. It may arise from light reflected or scattered by the sample. In fluorescence microscopy, the image contrast may arise from fluorescent light excited at one or more wavelengths and detected in corresponding detection bands at longer wavelengths than each excitation wavelength. Alternatively, the image contrast may arise from differences in the fluorescence lifetime of the sample.

The fluorescence may originate from single individually-resolvable molecules. The fluorescence of the molecules may be switched on or off through any photoactivation or photoswitching mechanism, which may be controlled by illumination of the sample at one or more additional wavelengths.

In alternative embodiments, the image contrast may arise from the polarization state of the reflected or scattered light, or the polarization state of the emitted fluorescence.

Although the second optical subassembly 18 may be produced as a distinct set of optical components (e.g. lenses 38 and 40), in alternative embodiments the second optical subassembly 18 may share common optical components with parts of the first optical subassembly 17, whilst also achieving the same level of compensation against aberrations. One example of such an alternative embodiment produces magnified image 47 rather than image 42, and involves placing an obliquely angled mirror along the plane indicated by a solid line 44 at the intermediate focal plane (image 36), resulting in image 47 (Image 3') being produced (via mirror 45 and lens 46). The angle of the mirror at the intermediate focal plane is half the angle of the slope of the oblique plane being imaged. Mirror 45 may also consist of a larger partially reflective mirror that covers the whole back aperture of lens 34.

The concept of using a second optical subassembly 18 at an angle to a first optical subassembly 17, as described above, may be used separately from the concept of a common objective lens 26 for directing the illumination and collected beams at 90° to one another, and vice versa.

Figure 5:
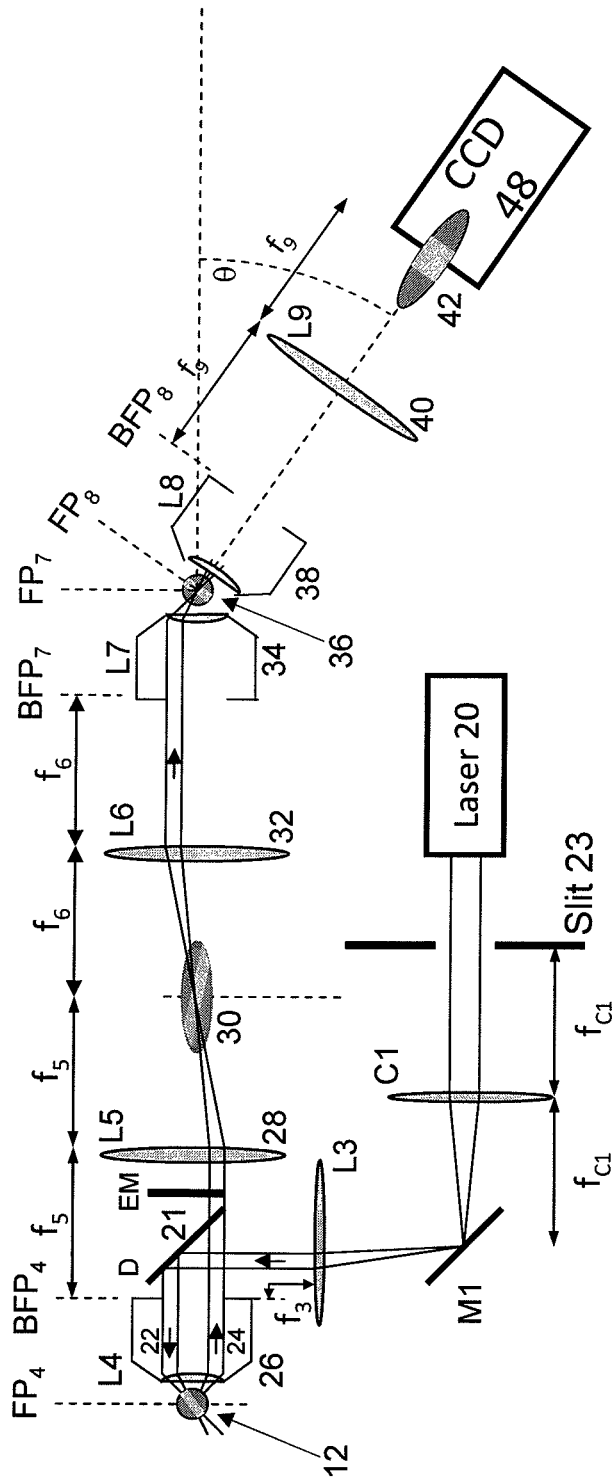

FIGS. 4 and 5 illustrate laboratory prototypes of embodiments of the invention. In essence, the optical arrangements in FIGS. 4 and 5 function in the same way as that of FIG. 3 as described above. However, being laboratory prototypes, the arrangements of FIGS. 4 and 5 provide additional practical details that are useful for putting the present invention into practice.

The components in FIGS. 4 and 5 have been allocated the following reference symbols:
L—spherical lens
C—cylindrical lens
$f_x$—focal length of lens x
$FP_x$—focal plane of lens x
$BFP_x$—back focal plane of lens x
D—dichroic filter
EM—emission filter In FIG. 4, the angle of the illumination 22 can be controlled by translating the slit 23. The thickness of the 'sheet' illumination at lens 26 can be controlled by changing the width of the slit 23.

FIG. 4 shows a fluorescent sphere as the object at the focus of lens 26. The stripe indicates the region where fluorescence is excited. The subsequent images 30, 36 and 42 (at lenses 28, 34 and 40) indicate how the image of the object is distorted (these images are not to scale and serve only to illustrate the distortion).

In FIG. 5 the optical configuration has been made more light efficient, as less of the excitation light 22 is blocked by the slit 23. The angle of the illumination can be controlled by the angle of mirror M1. As before, the width of the 'sheet' illumination at lens 26 can be controlled by changing the width of the slit 23.

Figure 6:
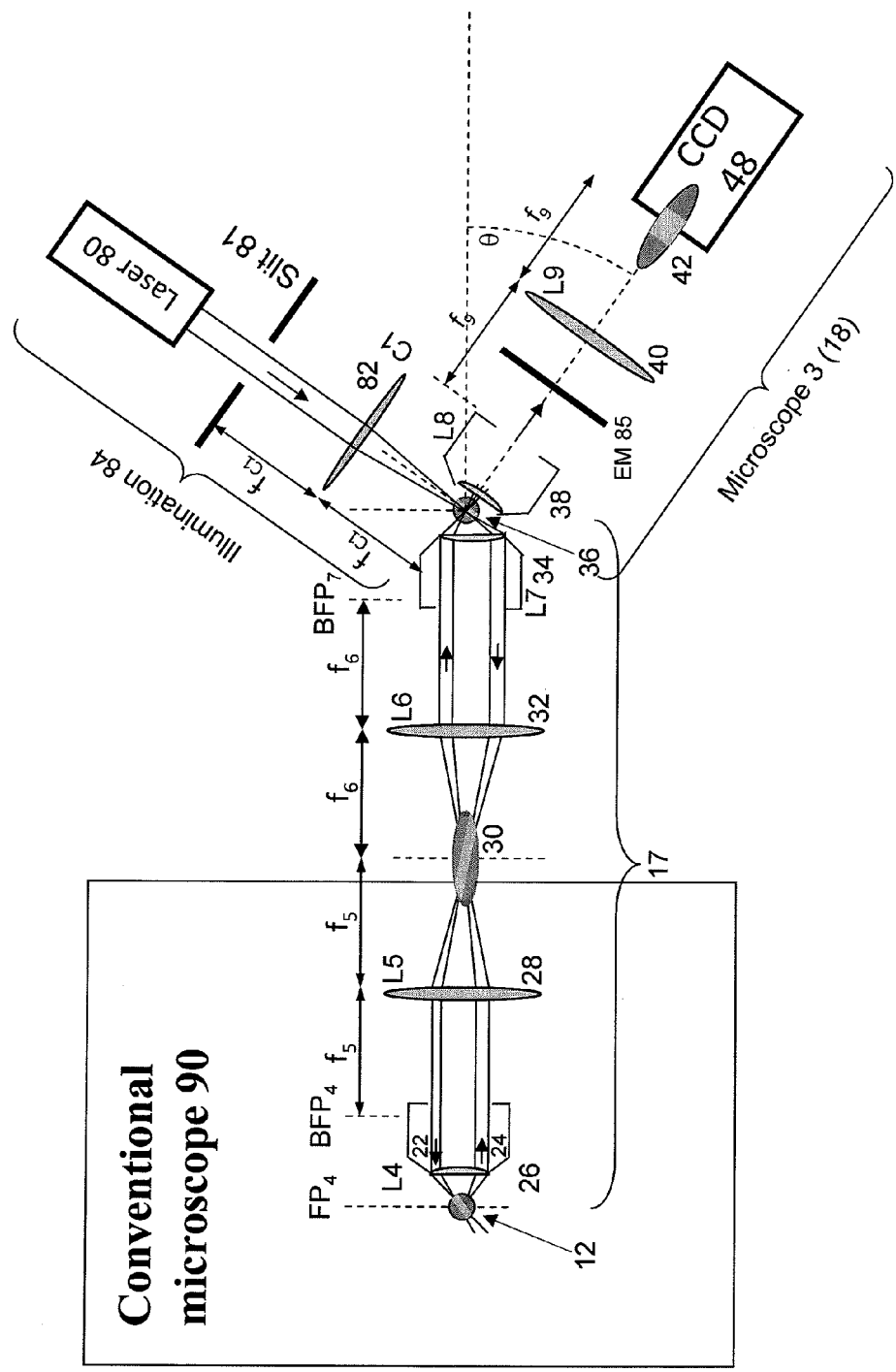
FIG. 6 illustrates the optical configuration of another embodiment of the invention.

An alternative method for providing the illumination sheet is to couple the illumination beam through the whole of the first optical subassembly 17, using an optical configuration such as the one shown in FIG. 6. Light from a laser 80 (or other illumination source) may be focused by a cylindrical lens 82 to produce a sheet of illumination in the focal plane of lens 34. This illumination sheet is then relayed through the first optical subassembly 17 to create a sheet of illumination at the sample 12.

A slit 81 may be used to adjust the width of the laser beam and hence the thickness of the illumination sheet. Other arrangements to adjust the position and width of the illumination sheet may be employed, as will be known by those skilled in the art. The optical axis of the illumination beam path 84 is preferably placed at an angle of 90° to the axis of the second optical subassembly 18.

The advantage of this arrangement is that all of the optical components required for oblique plane microscopy can then be placed outside the body of a 'conventional' microscope 90. For fluorescence microscopy, it would be necessary to add a fluorescence emission filter 85 into the beam path of the second optical subassembly 18 in order to prevent any excitation light reaching the detector 48.

In some cases, it may be advantageous to mount the components defining the illumination beam path 84 and the second optical subassembly 18 on the same mechanical platform. This will allow the illumination beam path 84 and the second optical subassembly 18 to be translated together in one or more dimensions using manual or motorized actuator (s). As the illumination and detection beam paths (84, 18) are accurately relayed to the sample 12 by the first optical subassembly 17, movement of the illumination and detection beam paths (84, 18) together will cause the plane illuminated and imaged to be moved through the sample 12. This movement of the illumination and detection beam paths (84, 18) can be achieved without affecting or moving the sample itself, and so will not perturb or cause vibrations in the sample 12.

In many situations conventional microscopes (e.g. 90) are fitted with several different microscope objectives. However, in oblique plane microscopy it is necessary to ensure that the correct magnification is obtained between the sample 12 and the intermediate image 36. When the microscope objective 26 is exchanged for one of a different magnification it is possible to employ a mechanical system that also changes the effective focal length of lens 32 at the same time, thus maintaining the correct desired overall magnification within the first optical subassembly 17. It may also be necessary to move other optical components at the same time in order to achieve the necessary path lengths, i.e. to maintain the correct separation between lens 32 and lens 34 and subsequent optical components. This can be achieved by mounting elements 84, 18 and 34 all on the same mechanical platform and translating them together. The same effect could be achieved in other ways that will be apparent to those skilled in the art.

It is also possible to insert an image rotating prism, e.g. a Dove prism or such like, immediately behind the back aperture of the objective lens 26 in order to change the orientation of the oblique illumination plane and the obliquely imaged plane in the sample simultaneously, without the need to physically rotate relatively large parts of the apparatus.

Optical arrangements according to embodiments of the present invention may be used to image static samples, or may be employed to image particles or cells flowing through the oblique image plane, e.g. in a microfluidic device. Such particles or cells may be intentionally flowed through the oblique image plane, as part of the imaging procedure.

An optical arrangement embodying the present invention may be integrated in a microscope, or provided as a "bolt-on" attachment for an existing microscope. Indeed, a conventional microscope could be used to provide the functionality of the first microscope part 14, provided a sufficiently high NA objective lens 26 is employed. The optical arrangement may be combined with an electronically-controlled stage for positioning the sample or for moving the sample in one or more directions. By scanning the sample in one or more directions it is then possible to build up a 3D image of the sample.

Figure 7:
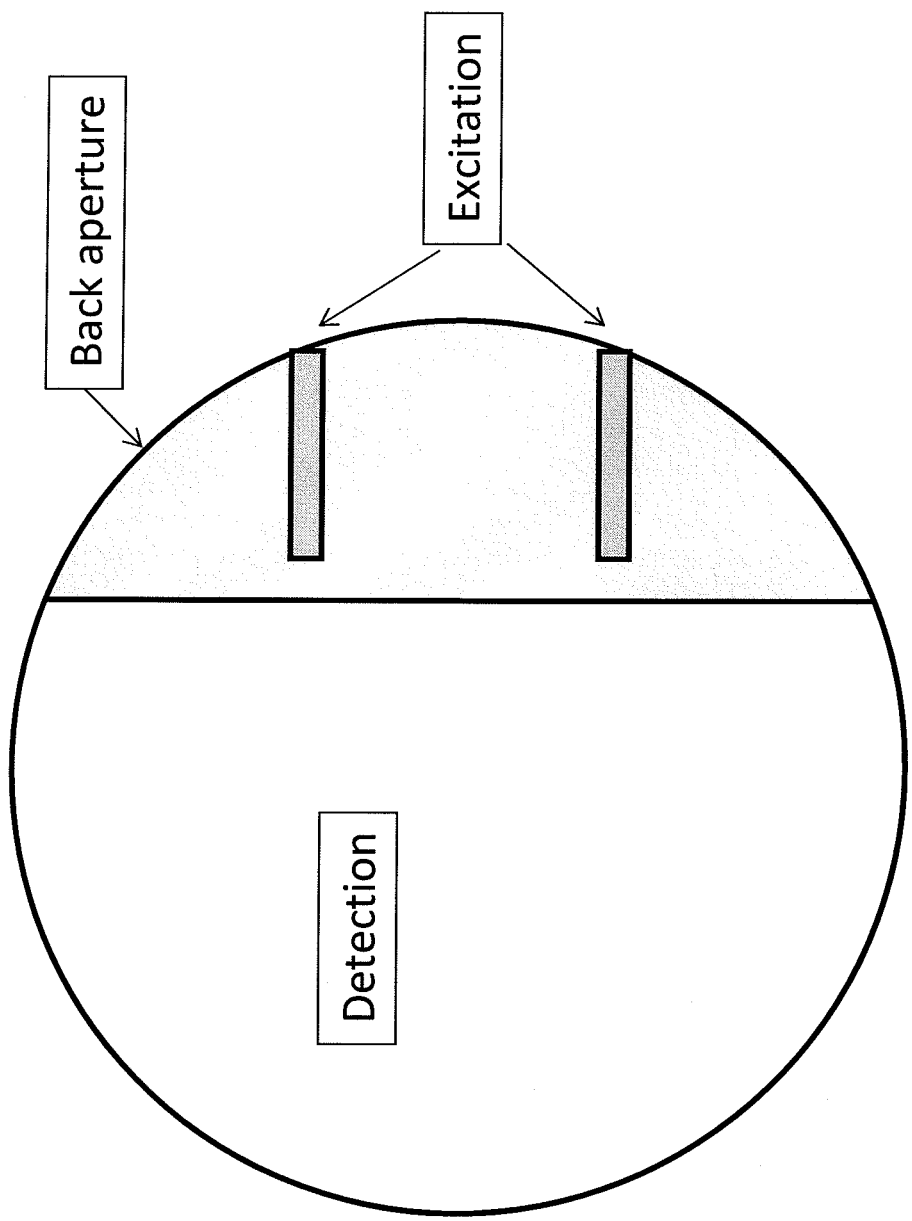
FIG. 7 illustrates the distribution of beams at the back aperture of the microscope objective when using a structured oblique illumination pattern.

Embodiments of the invention could be extended to exploit the possibility of patterning the excitation sheet illumination in the plane of the illumination sheet. More explicitly, it is possible to pattern the excitation in the direction that is both perpendicular to the direction of propagation of the excitation beam and parallel to the plane of the illumination. For example, illuminating the back aperture of lens 26 in the fashion depicted in FIG. 7 would lead to a sinusoidal patterning of the illumination sheet (i.e. effectively a sinusoidal grating). By varying or modulating this patterned illumination, acquiring multiple images at different modulations (grating positions) and then applying image processing techniques, it would be possible to achieve an enhanced resolution in the direction perpendicular to the grating pattern without compromising the thickness of the thin sheet of illumination. This technique may be termed "resolution enhancement though structured illumination".

Summary of Advantages of Oblique Plane Microscopy (OPM)
- conventional sample preparation techniques, e.g. glass microscope slides, may be used
- minimal photobleaching and phototoxicity of the sample
- no side-lobes or pedestal on the 'axial' point spread function (e.g. as does occur for Nipkow disc microscopy)
- no moving parts required to obtain a 2D image—good for imaging dynamics
- no calculation required to get sectioned image
- can be a "bolt-on" to existing microscopes
- good for 3D imaging when combined with a motorized xy-stage to position the sample Comments on Some Prior Art Methods for Imaging an Oblique Plane The principle of imaging an oblique plane in a sample per se is not new and, for example, is the subject of WO 03/027644 A1, U.S. Pat. No. 5,715,081 and US 2006/0007531 A1. However, all of these methods make use of a dispersive element, such as a prism or a diffraction grating, to achieve the tilted or oblique image plane. The use of such dispersive elements requires the use of lenses with very low chromatic aberration in order to be able to achieve a high quality final image. The technique presented here is novel inter alia in that no dispersive element is required. Also, in the technique presented here, only a part of the available numerical aperture of the objective lens is used to image the sample at an oblique angle, while another part of the lens is used to illuminate the sample at a different angle.

APPENDIX

Figure 8:
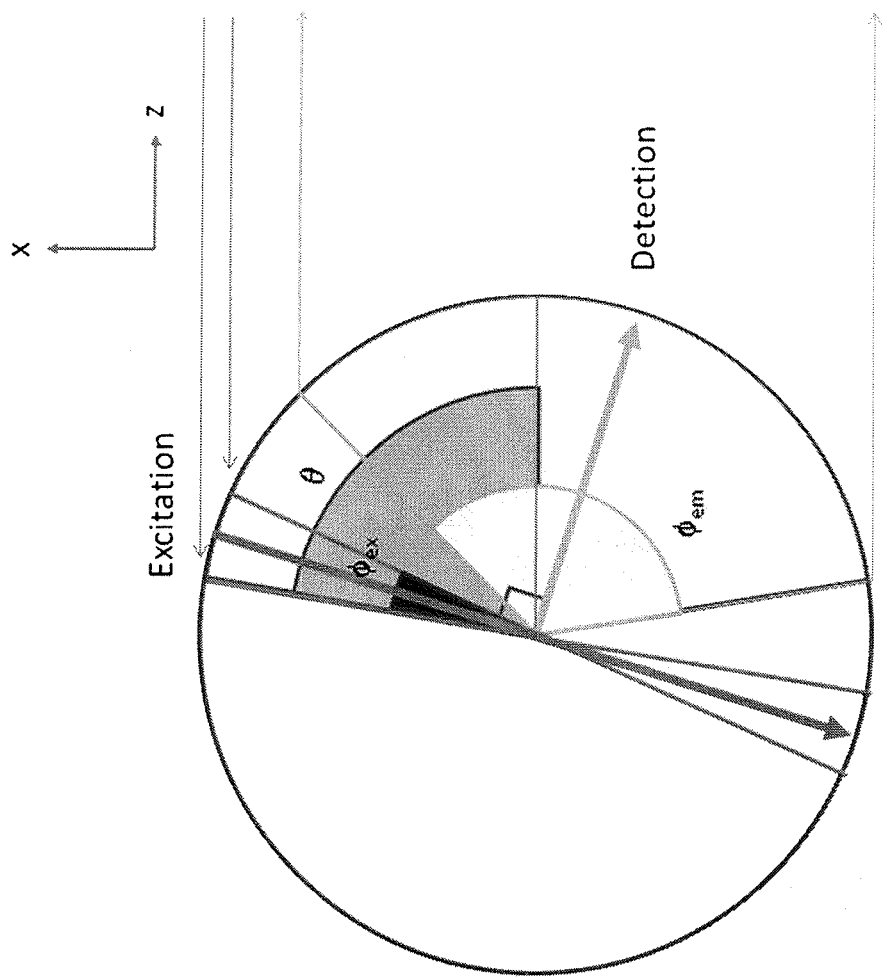
FIG. 8 illustrates the angular distribution of beams at the sample (as discussed in Appendix 1)

FIG. 8 is a diagram showing the angular distribution of beams at the sample. The geometry of FIG. 8 is as follows:

Excitation and detection rays intersect at 90° at the sample.
$\theta$=half angle subtended by lens
$\phi_{ex}$=half angle of excitation rays
$\phi_{em}$=half angle of emission rays The numerical aperture of the objective lens is defined as:

$$NA = n \sin \theta$$

One definition of the resolution of a lens is that of the Rayleigh criterion, $$d = 0.61 \lambda / n \sin \theta$$

where d is the position of the first minimum of the point spread function relative to the maximum.

In order that the excitation and emission rays intersect at 90° then the following condition must be satisfied:

$$\phi_{em} = 2\theta - \phi_{ex} - \pi/2$$

As an example, for a lens with NA=1.2 (water, n=1.33) then $\theta$=65° ($d_{lens}$=0.3 µm). If $\phi_{ex}$=10° then $\phi_{em}$=30° and $d_{ex}=d_z$=1.8 µm, which is an estimate of the thickness of the illumination sheet, i.e. 'z' resolution. Also, $d_{em}=d_x=d_y$=0.46 µm, which is an estimate of the resolution achieved in the plane of the sheet illumination, i.e. the 'x' and 'y' resolution.

The range over which the sheet illumination remains thin is determined by the divergence of the illumination beam, which is given by the Rayleigh length:

$$z_r = \pi r^2 / \lambda = d_{ex}^2 / 4\lambda,$$

then, for this example, $z_r$=5 µm. The confocal parameter is given by $2z_r$, which equals 10 µm in this example. Decreasing $\phi_{ex}$ will increase the confocal parameter at the expense of increasing the thickness of the illumination sheet (or 'z' resolution).

Figure 9:
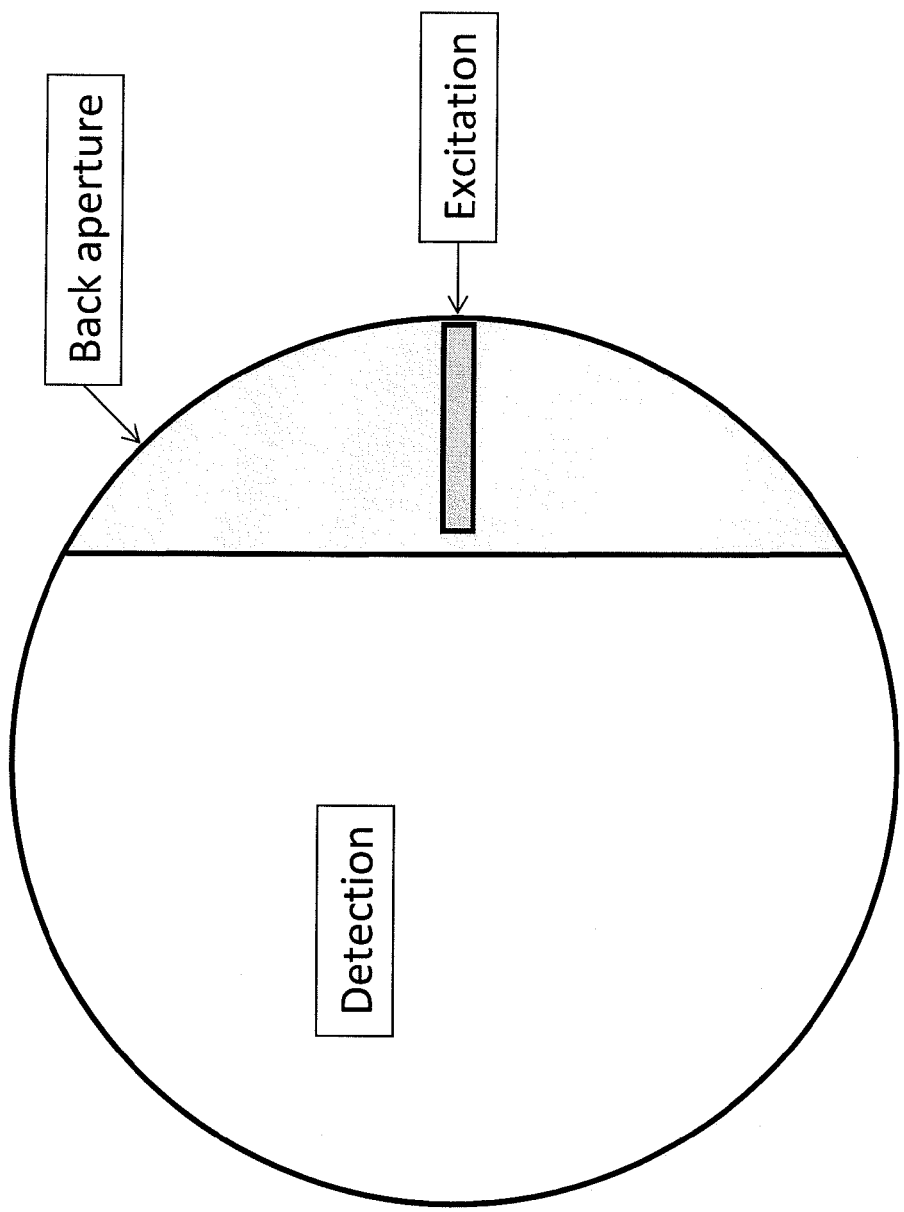
FIG. 9 illustrates the distribution of beams at the back aperture of the microscope objective (see Appendix 1).

FIG. 9 sketches how the excitation and detection rays occupy the back aperture of the microscope objective 26.

REFERENCES

[1] E. H. K. Stelzer et al, Microscope with a viewing direction perpendicular to the illumination direction, US 2006/0033987
[2] E. H. K. Stelzer, Single plane illumination microscope, US 2007/0109633
[3] A. H. Voie et al, Orthogonal-plane fluorescence optical sectioning: three-dimensional imaging of macroscopic biological specimens, J. Microscopy 170(3), pp. 229-236, 1993
[4] E. Fuchs, J. S. Jaffe, R. A. Long, and F. Azam, Opt. Express 10, pp. 145, 2002
[5] J. Huisken, J. Swoger, F. Del Bene, J. Wittbrodt, and E. H. K. Stelzer, Science 305, pp. 1007, 2004
[6] M. Tokunaga et al, Highly inclined thin illumination enables clear single-molecule imaging in cells, Nature Methods 5(2) pp. 159-161, 2008
[7] C. A. Konopka and S. Y. Bednarek, Variable-angle epifluorescence microscopy: a new way to look at protein dynamics in the plant cell cortex, The Plant Journal 58, pp. 186-196, 2008
[8] E. J. Botcherby et al, Aberration-free optical refocusing in high numerical aperture microscopy, Optics Letters 32(14), 2007

The invention claimed is:

1. An optical arrangement for oblique plane microscopy, comprising:
   a first optical subassembly having a numerical aperture, and including an objective lens arranged to receive light from a sample in use, and configured to produce an intermediate image of the sample; and
   a second optical subassembly focused on the intermediate image and having a numerical aperture, the numerical aperture of the first optical subassembly being greater than the numerical aperture of the second optical subassembly, the second optical subassembly having an optical axis being at an angle to an optical axis of the first optical subassembly at the point of the intermediate image, such that the second optical subassembly images an oblique plane in the intermediate image, corresponding to an oblique plane in the sample.

2. The optical arrangement as claimed in claim 1, wherein the first optical subassembly comprises a first part arranged to produce a magnified image of the sample, and a second part arranged to de-magnify the magnified image obtained from the first part and thereby form the intermediate image.

3. The optical arrangement as claimed in claim 2, wherein the first and second optical subassemblies share common optical components.

4. The optical arrangement as claimed in claim 3, wherein the first and second optical subassemblies share common optical components by providing a plane mirror at the focus of the second part of the first optical subassembly.

5. The optical arrangement as claimed in claim 1, wherein, if the sample is placed in a first immersion medium having a refractive index $n_1$, or the intermediate image is formed in a second immersion medium having a refractive index $n_2$, then the first optical subassembly is configured to produce the intermediate image with a magnification of M in both lateral and axial directions, where M is equal to a ratio $(n_1/n_2)$ of the refractive indices of the first and second immersion media.

6. The optical arrangement as claimed in claim 1, wherein the objective lens has a numerical aperture of greater than 0.5 in air and greater than 0.7 in immersion oil.

7. The optical arrangement as claimed in claim 1, further comprising a light source arranged to provide an incident beam of light to illuminate or excite an oblique plane in the sample, the oblique plane illuminated/excited corresponding to the oblique plane being imaged.

8. The optical arrangement as claimed in claim 7, wherein the incident beam of light is directed through the objective lens.

9. The optical arrangement as claimed in claim 8, wherein the incident beam of light is incident on the sample at an angle of substantially 90° relative to a beam of light received from the sample through the objective lens.

10. The optical arrangement as claimed in claim 7, wherein the incident beam of light is directed along the whole of the first optical subassembly.

11. The optical arrangement as claimed in claim 7, wherein components defining an illumination beam path and the second optical subassembly are mounted on a common platform.

12. The optical arrangement as claimed in claim 11, and further comprising actuation means for translating the components defining the illumination beam path and the second optical subassembly together.

13. The optical arrangement as claimed in claim 1, further comprising means for changing the magnification of the objective lens, and means for changing one or more optical components elsewhere in the optical arrangement in correspondence with the change in magnification of the objective lens, so as to maintain a desired overall magnification within the first optical subassembly.

14. The optical arrangement as claimed in claim 1, further comprising an image rotating prism behind the objective lens.

15. The optical arrangement as claimed in claim 14, wherein the image rotating prism is a Dove prism.

16. The optical arrangement as claimed in claim 1, arranged such that image contrast arises from fluorescent light emitted from the sample.

17. The optical arrangement as claimed in claim 1, in combination with an electronically-controlled stage for positioning the sample or for moving the sample in one or more directions.

18. The optical arrangement as claimed in claim 1, wherein the second optical subassembly is arranged to have a combination of both a working distance of greater than 1 mm and a numerical aperture of greater than 0.5 in air and greater than 0.7 in immersion oil.

19. A microscope comprising an optical arrangement as claimed in claim 1.

20. A method of performing oblique plane microscopy, comprising the steps of:
receiving light from a sample via a first optical subassembly having a numerical aperture, and producing an intermediate image of the sample; and
focusing a second optical subassembly on the intermediate image, the second optical subassembly having a numerical aperture, the numerical aperture of the first optical subassembly being greater than the numerical aperture of the second optical subassembly, the second optical subassembly further having an optical axis being at an angle to an optical axis of the first optical subassembly at the point of the intermediate image, such that the second optical subassembly images an oblique plane in the intermediate image, corresponding to an oblique plane in the sample.

21. The method as claimed in claim 20, wherein image contrast arises from fluorescent light emitted from the sample.

22. The method as claimed in claim 21, wherein the fluorescence originates from single individually-resolvable molecules.

23. The method as claimed in claim 21, further comprising adjusting the number of fluorescent molecules in the sample by activating or deactivating the fluorescence via a photoactivation or photo-switching mechanism.

24. The method as claimed in claim 23, wherein the photoactivation or photo-switching mechanism is controlled by illumination of the sample at one or more additional wavelengths.

25. The method as claimed in claim 20, wherein image contrast arises from light reflected or scattered by the sample, or from fluorescent light emitted from the sample, and the method further comprises modifying an excitation sheet so that it exhibits a more complex form such as a sinusoidal grating.

26. The method as claimed in claim 25, further comprising modulating a position or phase of the complex illumination and acquiring a plurality of images at different modulations.

* * * * *